United States Patent [19]

Gaspar et al.

[11] 4,239,592

[45] Dec. 16, 1980

[54] STARCH BLEND, PROCESS OF SIZING PAPER THEREWITH, AND PRODUCT THEREOF

[75] Inventors: Lawrence A. Gaspar, Lebanon; Martin Tessler, Edison; Alexander R. Malcolm, Middlesex, all of N.J.

[73] Assignee: National Starch and Chemical Corp., Bridgewater, N.J.

[21] Appl. No.: 741,605

[22] Filed: Nov. 15, 1976

[51] Int. Cl.³ ............................................. D21H 3/28
[52] U.S. Cl. .................................... 162/175; 106/210
[58] Field of Search ............... 162/175; 106/210, 213; 427/395; 428/537; 536/107, 108, 110

[56] References Cited

U.S. PATENT DOCUMENTS

| | | | |
|---|---|---|---|
| 2,661,349 | 12/1953 | Caldwell et al. | 536/110 |
| 3,320,080 | 5/1967 | Mazzarella et al. | 106/213 |
| 3,468,706 | 9/1969 | Speakman | 162/175 |
| 3,732,207 | 5/1973 | Kovats | 106/213 |
| 3,873,336 | 3/1975 | Lambert et al. | 162/175 |

OTHER PUBLICATIONS

Casey "Pulp & Paper" vol. II (1960) pp. 946 & 947.

*Primary Examiner*—Peter Chin
*Attorney, Agent, or Firm*—James & Franklin

[57] ABSTRACT

A starch blend of hydrophobic and non-hydrophobic starches, an improved process of surface sizing paper therewith, and the sized paper product are disclosed. The hydrophobic starch component comprises starch monoesters of selected dicarboxylic acids.

23 Claims, No Drawings

STARCH BLEND, PROCESS OF SIZING PAPER THEREWITH, AND PRODUCT THEREOF

BACKGROUND OF THE INVENTION

I. Field of the Invention

This invention relates to an improved process of surface sizing paper and paperboard utilizing a starch blend of hydrophobic and non-hydrophobic starches. In a further aspect, the invention relates to the sized paper product as well as to the novel size blend.

As used herein, the terms "paper and paperboard" include sheet-like masses and molded products made from fibrous cellulosic materials which may be derived from both natural and synthetic sources. Also included are sheet-like masses and molded products prepared from combinations of cellulosic and non-cellulosic materials derived from synthetics such as polyamide, polyester and polyacrylic resin fibers as well as from mineral fibers such as asbestos and glass.

II. Brief Description of the Prior Art

Paper and paperboard are often sized with various materials for the purpose of increasing their strength, their resistance to picking and scuffing, and their resistance to undue penetration of water, organic solvents, oils, inks and various types of aqueous solutions as well as for the purpose of improving their smoothness and optical characteristics. When sizing materials are applied to the surface of a web or sheet in order to cement the surface fibers to the body of the paper and to modify the sheet surface, the process is known as external or surface sizing; the latter process being quite distinct from an internal sizing process wherein sizing agents are admixed with the pulp slurry prior to its being converted into web or sheet form.

Among various materials which have been utilized as surface sizing agents are included conventional and modified starches, polyvinyl alcohol, cellulosic derivatives, gelatin, rosin, proteins such as casein, and synthetic polymers. Although these materials are effective to various degrees under certain conditions, their use is nonetheless subject to one or more limitations. For example, it is often necessary to utilize high concentration levels of such sizes in order to achieve the desired strength and aqueous holdout characteristics. Since it is known that the opacity and brightness of the base paper sheet decrease in proportion to the amount of size that is applied thereto, a direct result of the required use of such high concentration levels is a reduction in the optical properties of the treated paper. Furthermore, the use of such high concentration levels makes the sizing of specialty papers economically unattractive inasmuch as high cost, quality sizes, e.g. gelatin, animal glue and casein, are usually utilized for such purposes. In addition, certain prior art sizing agents impart relatively poor water resistance and must be used in conjunction with insolubilizing agents in order that satisfactory water resistance is obtained.

It is the prime object of this invention to provide improved starch based surface sizing agents whose use results in the preparation of paper which is characterized by improved water resistance and other size properties. A further object of this invention involves the use of surface sizing agents which may be employed with all types of paper fiber. Various other objects and advantages of this invention will become apparent to the practitioner from the following detailed description.

SUMMARY OF THE INVENTION

We have found that the use of aqueous dispersions of blends of hydrophobic starch monoesters of specified dicarboxylic acids (later defined) and non-hydrophobic starches as surface sizes in accordance with the process of this invention results in the preparation of paper and paperboard products which display significantly improved size properties. Thus, the starch sizes herein provide improved water resistance and wet abrasion properties without the necessity of being combined with insolubilizing agents. The sizes also provide improved holdout to aqueous liquids, resistance to ink penetration, etc. over many commercially used starch sizes.

The starch blend (mixture) is comprised of 1 to 20 parts by weight of a hydrophobic starch and correspondingly (to total 100 parts) 99 to 80 parts by weight of a compatible non-hydrophobic starch. Preferred blends will contain from about 4 to 14 parts by weight of hydrophobic starch and 96 to 86 parts by weight of non-hydrophobic starch.

While use of hydrophobic starches as a sole surface sizing agent has been proposed in the prior art (see U.S. Pat. No. 2,661,349 to C. G. Caldwell et al.), difficulties arise in such use because of their inherent high viscosity in aqueous dispersions. Unless the hydrophobic starch has been prepared using a slightly degraded (fluidity) starch base or is subsequently modified to reduce its viscosity, it is essentially unworkable. The necessary modification to produce a useful viscosity adds to the cost of the hydrophobic starch.

The starch blends described herein possess the advantage of permitting use of hydrophobic starches which have been prepared from starch bases which have not been modified to reduce the viscosity of their aqueous dispersions, thereby moderating the problems of high viscosity.

Moreover, experimental work has indicated that the sizing properties of the hydrophobic starches used alone is not significantly better than that of starch blends where the hydrophobic starch is contained in proportions of about 12 to 14 percent of the blend. When the proportion of the hydrophobic starch in the starch blend reaches about 12 to 14 percent, further increases of hydrophobic starch in the blend produce minimal added improvement in the sizing properties of the resulant sized paper. Thus, the blends herein present a means of obtaining benefits of sizing with hydrophobic starches which are economically attractive.

DESCRIPTION OF PREFERRED EMBODIMENTS

The applicable starch bases which may be used in preparing the hydrophobic starch component may be derived from any plant source including corn, potato, sweet potato wheat, rice, sago, tapioca, waxy maize, sorghum, high amylose corn, or the like. Also included are conversion products derived from any of the latter bases including for example dextrins prepared by the hydrolytic action of acid and/or heat; oxidized starches prepared by treatment with oxidants such as sodium hypochlorite; fluidity or thin boiling starches prepared, for example, by enzyme conversion or mild acid hydrolysis; and derivatized starches such as ethers and esters. If the desired starch blend is to be a granular starch then obviously the initial starting material of the hydrophobic (and non-hydrophobic) component must be in granular form. It is to be noted that the products of this invention may also be prepared employing gelatinized starches, i.e. non-granular starches.

The hydrophobic starches useful as sizes herein are the starch monoesters of dicarboxylic acids wherein the dicarboxylic acids are selected from the group consisting of aliphatic (saturated and unsaturated), aromatic, cycloaliphatic, bicycloaliphatic dicarboxylic acids; and the alkyl and halogen substituted derivatives of said dicarboxylic acids. The halogen may be chlorine, fluorine or bromine. The dicarboxylic acids (or substituted dicarboxylic acids) will contain from 8–22 carbon atoms in total, and the carboxylic acid groups are positioned on adjacent carbon atoms. It is noted that the hydrophobic starch may itself be a slightly degraded (fluidity) starch and/or may contain additional substituent groups, for example, tertiary amine or quaternary ammonium groups or acetyl ester or hydroxypropyl ether groups, and the like.

The hydrophobic starch monoesters may be prepared by reacting starch with the cyclic anhydride of the selected dicarboxylic acid. Among the suitable acid anhydrides are included 1,4,5,6,7,7-hexachloro-5-norbornene-2,3-dicarboxylic anhydride, phthalic anhydride, tetrachlorophthalic anhydride, 1-octenylsuccinic anhydride, endo-cis-5-norbornene-2,3-dicarboxylic anhydride, 1,2-cyclohexane-dicarboxylic anhydride, cis-4-cyclohexene-1,2-dicarboxylic anhydride, etc. The reaction of starch with anhydrides of dicarboxylic acids is well described in the literature. For example, the reaction of starch and 1-octenylsuccinic anhydride is described in U.S. Pat. No. 2,661,349 to C. G. Caldwell et al.

With regard to the degree of substitution (D.S.) which is required in the hydrophobic starch ester derivatives suitable for use in the starch blends herein, the selected starch base should be reacted with sufficient cyclic dicarboxylic anhydride reagent in order that the resulting starch ester has a degree of substitution i.e., the number of ester substituent groups per anhydroglucose unit of the starch molecule, ranging from about 0.002 to 0.050, and preferably from 0.020 to 0.040.

In some cases the reaction efficiency of starch with cyclic anhydrides of dicarboxylic acids in water is greatly improved when the reaction is carried out in the presence of small amounts of inorganic phosphate. For example, tetrachlorophthalic anhydride reacts with corn starch in the presence of disodium phosphate to yield derivatized starch esters having good hydrophobic sizing properties. Attempts to prepare similar hydrophobic starch esters in water without using inorganic phosphate result in less efficient esterification of the starch, and the resulting derivatives are less effective as hydrophobic sizes. In other cases, for example, when 1-octenylsuccinic anhydride is used, good hydrophobic sizes are formed either with or without the use of inorganic phosphate during the aqueous starch esterification reaction.

The non-hydrophobic starch component of the starch blend is defined to be any starch known for use as a surface size (excluding the hydrophobic starch monoesters described above). Applicable starch bases which may be used in preparing the non-hydrophobic starch component may be derived from any plant source including corn, potato, sweet potato, wheat, rice, sago, tapioca, waxy maize, sorghum, high amylose corn, or the like. Also included are conversion products derived from any of the latter bases including, for example, dextrins prepared by the hydrolytic action of acid and/or heat; oxidized starches prepared by treatment with oxidants such as sodium hypochlorite; fluidity to thin boiling starches prepared by enzyme conversion or mild acid hydrolysis; and derivatized starches such as ethers and esters. Thus, among the many non-hydrophobic starches useful in preparing the blend herein are unmodified corn starch (pearl starch) as well as tapioca, wheat, and potato starch. In common practice these starches are often thermally degraded acid or enzyme converted (degraded) to produce fluidity starches, i.e. starches having a lower viscosity than the native starch enabling use of higher starch solids and higher machine speeds. The native or degraded starches may likewise be chemically modified to result in, for example, oxidized, esterified or etherified starches. Representative examples of such starches are carboxymethyl starch, acetate ester of starch and hydroxypropyl starch.

Also useful as the non-hydrophobic starch herein are the cationic starches which are prepared, for example, by reacting starch through an etherification or esterification reaction with any reagent which will introduce a cationic group containing nitrogen, sulfur or phosphorus therein. Examples of such groups are the amine (primary, secondary, tertiary, or quaternary), sulfonium and phosphonium groups. The preferred cationic starch derivative is the tertiary amino alkyl ether resulting from the reaction of a starch under alkaline conditions, with a dialkyl amino alkyl halide. The general method for the preparation of such products is described in U.S. Pat. No. 2,813,093, issued Nov. 12, 1957. Employing a different process, the non-hydrophobic cationic starch may be prepared as described in U.S. Pat. No. 3,674,725, issued July 4, 1972.

While the tertiary amino alkyl ethers of starch are preferred, the primary and secondary amine derivatives as well as the corresponding starch esters may also be used. Thus, beside the reagents already named, one may react a starch product with amino alkyl anhydrides, amino alkyl epoxides or halides, and the corresponding compounds containing aryl in addition to alkyl groups. Furthermore, one may also employ tertiary amino alkyl ethers of starch which also contain either hydroxyalkyl, e.g. hydroxyethyl, hydroxypropyl, etc., groups or ester, e.g. acetate, sulfate, phosphate, etc., groups. Such difunctional derivatives may be prepared by subjecting a starch to a hydroxyalkylation or esterification reaction along with the requisite aminoalkylation reaction in a procedure whereby the two reactions may be conducted simultaneously or in any desired order.

It should also be mentioned that the starch-amine products may be subsequently treated by known methods so as to result in the quaternary ammonium salt, or, such a quaternary ammonium salt may be made directly from a starch product, for example, by treating it with the reaction product of an epihalohydrin and a tertiary amine or tertiary amine salt. In either case, the resulting starch derivative is cationic in nature and is suitable for use in the novel process of this invention.

The general preparation of sulfonium derivatives is described in U.S. Pat. No. 2,989,520, issued June 20, 1961, and involves essentially the reaction of starch, in an aqueous alkaline medium, with a beta-halogeno alkyl sulfonium salt, vinyl sulfonium salt or epoxy alkyl sulfonium salt. The general preparation of phosphonium derivatives is described in U.S. Pat. No. 3,077,469, issued Feb. 12, 1963, and involves essentially the reaction of starch, in an aqueous alkaline medium, with a beta-halogeno alkyl phosphonium salt. Other suitable derivatives will be apparent to the practitioner, since our invention may employ any starch derivatives which have been rendered cationic by the introduction of an electrically positively charged moiety into the starch molecule.

With regard to the degree of substitution which is required in the cationic starch derivatives suitable for use in our process, it is advisable to react the selected starch with sufficient cationic reagent in order that the resulting cationic starch derivatives exhibit a degree of substitution ranging from about 0.01 to 0.20, and preferably from 0.02 to 0.10.

The starch blends of this invention may be successfully utilized for the sizing of paper prepared from all types of both cellulosic and combinations of cellulosic with noncellulosic fibers. The hardwood or soft wood cellulosic fibers which may be used include bleached and unbleached sulfate (kraft), bleached and unbleached sulfite, bleached and unbleached soda, neutral sulfite semi-chemical, chemi-groundwood, groundwood, and any combination of these fibers. These designations refer to wood pulp fibers which have been prepared by means of a variety of processes which are used in the pulp and paper industry. In addition, synthetic cellulose fibers of the viscose rayon or regenerated cellulose type can also be used, as well as recycled waste papers from various sources.

All types of paper dyes and tints, pigments and fillers may be added to the paper (in the usual manner) which is to be sized in accordance with this invention. Such materials include clay, talc, titanium dioxide, calcium carbonate, calcium sulfate, and diatomaceous earths. The paper can contain other additives, including rosin and alum and other internal sizes. Other surface sizing compounds as well as pigments, dyes and lubricants can also be used in conjunction with the size blends described herein.

With regard to forming the starch blends for use, they may be formed by mixing the hydrophobic and non-hydrophobic starches in dry form, or adding one dry component to the aqueous dispersion of the second component, or, appropriate amounts of aqueous dispersions of these starches may be combined to form the final starch dispersion. The actual use of the hydrophobic/non-hydrophobic starch blends described herein involves dispersing the blend in water at a concentration of about 2.0 to 20.0%, preferably 3.0 to 8.0%, dry basis. As is well known to those skilled in the art, suitable conditions must be selected by the practiner to prevent undesired decomposition of the hydrophobic starch esters. For example, cooking at high pH levels will result in hydrolysis of the ester linkage, while cooking at low pH levels may result in hydrolysis of the starch molecule. In dispersing the starch ester of tetrachlorophthalic acid, a buffer must be used to prevent acid hydrolysis of the starch.

The starch size dispersion is then applied to a previously prepared paper or paperboard web by means of any conventional surface sizing technique. Included among these techniques are size press, tub, gate roll applicators and calender stack sizing procedures. Thus, for example, in a size press technique, surface sizing is accomplished by passing the web of paper between a pair of press rolls wherein the lower roll of the pair is rotating in a batch of the sizing dispersion. The surface of this roll picks up size and deposits it on the lower surface of the web. If desired, sizing may also be applied to the upper surface of the web by spraying it into the nip formed between the web and the upper roll, or by spraying it against the surface of the upper roll and allowing it to accumulate on the upper surface of the web as it enters the press. The sized webs are then dried by means of any conventional drying operation selected by the practitioner.

The hydrophobic/non-hydrophobic starch blends are ordinarily employed in amounts to provide a size concentration ranging from 0.25 to 15.0% of the weight of the finished dry paper. Within this range, the precise amount which is used will depend for the most part upon the type of pulp which is being utilized, the specific operating conditions, as well as the particular end use for which paper is destined.

The use of the starch blends described herein in accordance with the process of this invention has been found (as will be illustrated in the examples) to yield paper having improved size properties, for example, resistance to water or acidic ink solutions. A specified degree of size properties in paper can be achieved with a smaller amount of the described size utilized in accordance with the process of this invention. The presence of alum (papermaker's alum, $Al_2(SO_4)_3.14-18H_2O$) or other commonly used cationic donor in the size dispersion or in the web being sized appears to enhance the sizing properties achieved with the starch blends of the present invention. Representative cationic donors include, for example, polyamideamine resins chain extended with epichlorohydrin or other chain extender such as described in U.S. Pat. Nos. 2,929,154 and 3,793,279, as well as cationic urea-formaldehyde or melamine-formaldehyde resins.

The following examples will further illustrate the embodiment of this invention. In these examples all parts are given by weight unless otherwise noted.

EXAMPLE I

This example illustrates the preparation and use as a surface paper size of a starch blend typical of this invention. The improved hydrophobic properties exhibited by the sized paper are determined by means of several testing procedures.

The hydrophobic starch monoester utilized herein, designated "Starch A," was prepared in the following manner.

Starch A: A total of 200 parts corn starch was suspended in 300 parts water and 20 parts of disodium phosphate and 20 parts 1,4,5,6,7,7-hexachloro-5-norbornene-2,3-dicarboxylic anhydride added. The pH was lowered to 7.0 with 10% aqueous hydrochloric acid and the resulting mixture was agitated for 16 hours at 40° C. The pH at the end of the reaction period was 6.6. The pH was then lowered to 5.0 with 10% aqueous hydrochloric acid and the starch recovered by filtration, washed three times with water and dried. The hydrophobic starch had a D.S. of 0.004.

Six sizing dispersions comprising 7 parts, dry basis, of the starch or starch blends noted in Table I and 93 parts water, respectively, were prepared by heating the ingredients in a boiling water bath for 20 minutes and cooling to 140° F.

TABLE I

| | Sizing Dispersion (parts) | | | | | |
| --- | --- | --- | --- | --- | --- | --- |
| | A | B | C | D | E | F |
| Starch A | 0.64 | 0.33 | 0.33 | — | — | — |
| Acid hydrolyzed corn | 6.36 | — | — | 7.0 | — | — |

TABLE I-continued

| | Sizing Dispersion (parts) | | | | | |
|---|---|---|---|---|---|---|
| | A | B | C | D | E | F |
| starch (75 fluidity) treated with 5% acetic anhydride | | | | | | |
| Penford Gum 280 (Hydroxyethylated starch, sold by Penick & Ford, Ltd. Cedar Rapids, Iowa) | — | 6.67 | — | — | 7.0 | — |
| Acid hydrolyzed corn starch (65 fluidity) treated with 3% diethylaminoethyl chloride hydrochloride. | — | — | 6.67 | — | — | 7.0 |

The resulting dispersions were applied, by means of a conventional size press procedure, onto coating base stock paper made from a blend of bleached soft and hardwood pulps. The paper was then dried in an oven at 105° C., stored overnight at 72° F. and 50% relative humidity and weighed. The amount of sizing retained by the paper based on the weight of the dry unsized paper (expressed as % pick-up) was calculated from the increase in paper weight after sizing.

Using the test procedures described below, the properties of the sheets sized with sizing dispersions A, B, and C prepared using the starch blends of the invention were compared to sheets of identical paper which had been surface sized with similar sizing dispersions D, E, and F, but which do not contain hydrophobic Starch A.

Contact Angle

The contact angle of a drop of water on the surface of the sized paper was measured by a slight modification of the method of W. C. Bigelow, D. L. Pickett and W. A. Zisman, J. Colloid Sci. 1, 513 (1946). A picture was taken of the drop of water on the surface at 30 sec. contact time, the picture was then projected onto a large screen, and the contact angle measured with a protractor. The larger the contact angle, the more hydrophobic is the surface. The results obtained with 4 of the described dispersions are summarized below:

| Sizing Dispersion | % Pick-up | Contact Angle |
|---|---|---|
| A | 4.2 | 117.5° |
| B | 4.7 | 120.5° |
| D | 3.9 | 104.0° |
| E | 5.0 | 97.5° |

Water Penetration

The top of a piece of surface sized paper is dusted with finely ground potassium permanganate, the excess permanganate is tapped off, and the paper is floated on water. When water penetrates the paper the paper turns pink, and the time required for the paper to become uniformly pink is measured in seconds. The longer the time required for water to penetrate, the better the hydrophobic properties of the paper. The results of this test with 4 of the described dispersions are summarized below:

| Sizing Dispersion | % Pick-up | Water Penetration |
|---|---|---|
| B | 4.3 | 52.3 sec. |
| C | 2.5 | 40.4 sec. |
| E | 4.2 | 16.0 sec. |

-continued

| Sizing Dispersion | % Pick-up | Water Penetration |
|---|---|---|
| F | 5.0 | 29.0 sec. |

Cobb Size Water Absorption Test

This test measures the water resistance of a sized surface. A piece of weighed paper is placed in a Cobb tester, water is added and kept in contact with the paper for 30 seconds. The water is then poured off the surface of the paper and the paper reweighed. The percent weight increase is calculated and a lower percentage weight increase will be observed in sheets which exhibit greater resistance to water. The results obtained with sizing dispersions B and E are summarized below:

| Sizing Dispersion | % Pick-up | Cobb Size Water Absorption (per cent) |
|---|---|---|
| B | 4.3 | 29.3 |
| E | 4.2 | 41.4 |

The results summarized above clearly illustrate the excellent sizing properties exhibited by paper sheets which have been surface sized with hydrophobic/non-hydrophobic starch blends in accordance with the process of this invention (sizing dispersions A, B, and C) as compared to starch sizes which did not include the hydrophobic starch (sizing dispersions D, E, and F).

EXAMPLE II

This example illustrates the use of various cyclic dicarboxylic anhydrides in preparing the hydrophobic starch monoesters utilized in this invention.

Five additional hydrophobic starch monoesters were prepared in an identical manner as described in Example I, except for the changes in reagents and proportions listed below. The starch used in all cases was corn starch.

| | Esterification Reagent | % Reagent | D.S. |
|---|---|---|---|
| Starch B | tetrachlorophthalic anhydride | 10 | — |
| Starch C | 1-octenylsuccinic anhydride | 10 | 0.027 |
| Starch D | hexahydro-4-methylphthalic anhydride | 10 | 0.005 |
| Starch E | endo-cis-5-norbornene-2,3-dicarboxylic anhydride | 7 | 0.003 |
| Starch F | phthalic anhydride* | 5 | 0.042 |

*corn starch was reacted at room temperature with phthalic anhydride while controlling the pH at 8.0 with 3% sodium hydroxide.

Sizing dispersions were prepared in an identical manner as described in Example I with ingredients as noted in Table II.

TABLE II

| | Sizing Dispersion (parts) | | | | | | |
|---|---|---|---|---|---|---|---|
| | G | H | I | J | K | L | M |
| Starch B | 0.33 | — | — | — | — | — | — |
| Starch C | — | 0.33 | — | — | — | — | — |
| Starch D | — | — | 0.64 | — | — | — | — |
| Starch E | — | — | — | 0.64 | — | — | — |
| Starch F | — | — | — | — | 0.33 | — | — |
| Penford Gum 280 (Hydroxyethylated starch) | 6.67 | — | — | — | — | 7.0 | — |
| Acid Hydrolyzed corn starch (75 fluidity) | — | 6.67 | 6.36 | 6.36 | 6.67 | — | 7.0 |

TABLE II-continued

| | Sizing Dispersion (parts) | | | | | | |
|---|---|---|---|---|---|---|---|
| | G | H | I | J | K | L | M |
| treated with 5% acetic anhydride | | | | | | | |
| Water (total of water absorbed by starch and free water) | 93.0 | 93.0 | 93.0 | 93.0 | 93.0 | 93.0 | 93.0 |

The sizing dispersions were used to size paper as described in Example I and were thereafter evaluated in their sizing properties in the Water Penetration or Contact Angle test procedures. The results obtained are summarized below:

| Sizing Dispersion | % Pick-up | Water Penetration | Contact Angle |
|---|---|---|---|
| G | 4.9 | 44.6 sec. | — |
| L | 4.2 | 16.0 sec. | — |
| H | 2.8 | — | 121.0° |
| M | 3.1 | — | 98.5° |
| I | 3.0 | — | 121.0° |
| J | 2.0 | — | 117.5° |
| K | 4.0 | — | 105.0° |

The results show improved hydrophobic properties are possessed by the paper which has been surface sized utilized representative starch blends of this invention.

EXAMPLE III

This example illustrates the use of starches other than unmodified corn starch to prepare the hydrophobic starch component of the starch blend of this invention.

Two hydrophobic starch monoesters were prepared as follows:

Starch X—Starch X was prepared in an identical manner as Starch A of Example I except corn starch was replaced with waxy maize starch.

Starch Y—Starch Y was prepared in an identical manner as Starch A of Example I except corn starch was replaced with an acid hydrolyzed corn starch (65 fluidity) which had been treated with 3% diethylaminoethylchloride hydrochloride, the reaction temperature was 70° F., and the pH was controlled during the reaction to be 7.0 by periodically adding 3% aqueous sodium hydroxide.

Five sizing dispersions comprising 7 parts, dry basis, of the starch or starch mixtures noted in Table III and 93 parts water, respectively, were prepared by heating the ingredients in a boiling water bath for 20 minutes and cooling to 140° F.

TABLE III

| | Sizing Dispersion (parts) | | | | |
|---|---|---|---|---|---|
| | R | S | T | U | V |
| Starch X | 0.33 | — | — | — | — |
| Starch Y | — | 0.33 | — | — | 7.0 |
| Penford Gum 280 (Hydroxyethylated starch) | 6.67 | — | 7.0 | — | — |
| Acid hydrolyzed corn starch (75 fluidity) treated with 5% acetic anhydride | — | 6.67 | — | 7.0 | — |

The resulting dispersions were used to size paper and were thereafter evaluated in the Water Penetration and/or Contact Angle test procedure. Test results are summarized below:

| Sizing Dispersion | % Pick-up | Water Penetration | Contact Angle |
|---|---|---|---|
| R | 4.2 | 48.5 | — |
| T | 4.2 | 16.0 | — |
| S | 3.6 | — | 107.0° |
| U | 4.1 | — | 89.5° |
| V | 5.6 | 51.2 | 119.0° |

Again the test results show that improved hydrophobic properties are obtained with the size dispersions utilizing the hydrophobic starch monoesters described herein as opposed to dispersions lacking the hydrophobic starch component. Thus, it is seen that Sizing Dispersions R, S, and V (which utilized the hydrophobic starch alone) show superior test results as compared to Sizing Dispersions T and U, representing conventional non-hydrophobic starches.

EXAMPLE IV

This example is based on data obtained from experimental trails run at a paper mill using bleached kraft pulp. In forming the web, the pulp was maintained to have an alum level of approximately 1% based on weight of dry pulp.

The size dispersion, applied by means of a vertical size press, comprised a dispersion (about 4 to 5% solids) of a blend of 5% hydrophobic starch and 95% of a non-hydrophobic starch consisting of a cationic starch having a nitrogen content of about 0.24% (wt.) sold under the trademark "Cato-Size 20" by National Starch and Chemical Corporation. The hydrophobic starch was a corn starch monoester of 1-octenylsuccinic acid containing about 4% of 1-octenylsuccinic acid groups and prepared essentially as described in the aforementioned U.S. Pat. No. 2,661,349. The hydrophobic starch exhibited a D.S. of 0.032. The size dispersion was applied at a rate to provide a starch pick-up on paper of 60 pounds per ton of paper. Rosin was used in conventional manner at the concentrations given in Table IV below. The various trails were conducted as a continuous run where paper was prepared under a number of indicated conditions and the resultant paper samples were tested for their sizing properties in an ink flotation test and the Hercules size test. The ink flotation test comprises the measuring of time in seconds it takes for a sample of paper floated on its sized surface in ink to be fully colored. The Hercules size test relies on a measure of reflectance and comprises first setting the reflectance reading for the sized paper at 100% using a test apparatus incorporating a photoelectric cell. Thereafter an aqueous green ink (pH 2.6) is brought into contact with the upper surface of the sized paper and the resultant reflectance change on the underside of the paper is monitored until the reflectance reaches 60%. The time taken to effect this reflectance change (measured in seconds) is noted as a measure of the sizing property of the sized paper with respect to acid ink. Test conditions and results are given in Table IV.

TABLE IV

| Time | Sample Variable | Rosin #/ton | Pick-up #/ton | Ink Flotation | Hercules Size Test |
|---|---|---|---|---|---|
| 0755 | Control, no size | 24 | — | — | 4.0 sec. |
| 0800 | Cato-Size 20 | 24 | 60 | 7–10 sec. | 11.4 sec. |
| 0900 | Cato-Size 20 | 24 | 60 | 7–10 sec. | 17.0 sec. |
| 1030 | Starch Blend | 24 | 60 | 12–15 sec. | 43.7 sec. |
| 1420 | Starch Blend | 12 | 60 | 12–15 sec. | 47.9 sec. |

TABLE IV-continued

| Time | Sample Variable | Rosin #/ton | Pick-up #/ton | Ink Flotation | Hercules Size Test |
|---|---|---|---|---|---|
| 1630 | Starch Blend | 12 | 60 | 12-15 sec. | 46.3 sec. |

The above results show a marked improvement in sizing properties was obtained in using the starch blend as compared to use of the non-hydrophobic, cationic starch alone. Unexpectedly, these improved results were maintained even with a 50% decrease in rosin concentration.

Summarizing, it is seen that this invention provides an improved process of surface sizing paper and paperboard which relies on the use of a starch blend of a hydrophobic starch comprising starch monoesters of selected dicarboxylic acids and a non-hydrophobic starch. The starch blends present a means of obtaining benefits of surface sizing with hydrophobic starches which are practical and economically attractive.

Now that the preferred embodiments of the present invention have been described in detail, various modifications and improvements thereon will become readily apparent to those skilled in the art. Accordingly the spirit and scope of the present invention is to be limited only by the appended claims, and not by the foregoing disclosure.

We claim:

1. A paper or paperboard product having applied to the surface thereof a sizing amount of dispersion of a starch blend of 1-20 parts of a hydrophobic starch and 99-80 parts of a non-hydrophobic starch, said hydrophobic starch being a starch monoester of a dicarboxylic acid in which the two carboxylic acid groups are positioned on adjacent carbons, said dicarboxylic acids being selected from the group consisting of aliphatic, aromatic, cycloaliphatic, bicycloaliphatic dicarboxylic acids and alkyl and fluorine, chlorine, and bromine substituted derivatives thereof; and said dicarboxylic acids or substituted dicarboxylic acids have a total of 8-22 carbon atoms.

2. The paper or paperboard product of claim 1 wherein the hydrophobic starch is the monoester of dicarboxylic acids selected from the group consisting of n-octylsuccinic acid, 1-octenylsuccinic acid, phthalic acid, 1,4,5,6,7,7-hexachloro-5-norbornene-2,3-dicarboxylic acid, tetrachlorophthalic acid, endo-cis-5-norbornene-2,3-dicarboxylic acid, hexahydro-4-methylphthalic acid, 1,2-cyclohexane-dicarboxylic acid, and cis-4-cyclohexene-1,2-dicarboxylic acid.

3. The paper or paperboard product of claim 1 wherein said starch blend is applied in an amount to provide a size concentration ranging from 0.25 to 15.0% of the weight of the finished dry paper or paperboard.

4. The paper or paperboard of claim 1 wherein the hydrophobic starch has a degree of substitution of from about 0.002 to 0.050.

5. The paper or paperboard product of claim 1 wherein the non-hydrophobic starch is corn starch or waxy maize.

6. The paper or paperboard product of claim 1 wherein the non-hydrophobic starch is a cationically substituted corn starch.

7. The paper or paperboard product of claim 1 wherein the starch blend is comprised of 4-14 parts by weight of hydrophobic starch and 96-86 parts by weight of non-hydrophobic starch.

8. The paper or paperboard product of claim 3 wherein the hydrophobic starch is the monoester of n-octenylsuccinic acid.

9. The paper or paperboard product of claim 4 wherein the hydrophobic starch is also cationically substituted.

10. The paper of paperboard product of claim 1 wherein the starch blend is applied in the presence of alum or other cationic donor.

11. A process of surface sizing paper or paperboard which comprises the step of applying to the surface thereof a sizing amount of a dispersion of a starch blend of 1-20 parts of a hydrophobic starch and 99-80 parts of a non-hydrophobic starch, said hydrophobic starch being a starch monoester of a dicarboxylic acid in which the two carboxylic acid groups are positioned on adjacent carbon atoms, said dicarboxylic acids being selected from the group consisting of aliphatic, aromatic, cycloaliphatic, bicycloaliphatic dicarboxylic acids and alkyl and fluorine, bromine and chlorine substituted derivatives thereof; and said dicarboxylic acids or substituted dicarboxylic acids having a total of 8-22 carbon atoms.

12. The process of claim 11 wherein the hydrophobic starch is the monoester of dicarboxylic acids selected from the group consisting of n-octylsuccinic acid, 1-octenylsuccinic acid, phthalic acid, 1,4,5,6,7,7-hexachloro-5-norbornene-2,3-dicarboxylic acid, tetrachlorophthalic acid, endo-cis-5-norbornene-2,3-dicarboxylic acid, hexahydro-4-methylphthalic acid, 1,2-cyclohexane-dicarboxylic acid, and cis-4-cyclohexane-1,2-dicarboxylic acid.

13. The process of claim 11 wherein the hydrophobic starch has a degree of substitution of from about 0.002 to 0.050, and said starch blend is applied in an amount to provide a size concentration ranging from 0.25 to 15% of the weight of the finished dry paper or paperboard.

14. The process of claim 11 wherein the non-hydrophobic starch is corn starch or waxy maize.

15. The process of claim 11 wherein the non-hydrophobic starch is cationically substituted corn starch.

16. The process of claim 14 wherein the hydrophobic starch is also cationically substituted.

17. The process of claim 11 wherein the starch blend is applied in the presence of alum or other cationic donor.

18. A starch blend comprising 1-20 parts of a hydrophobic starch and 99-80 parts of a non-hydrophobic starch, said hydrophobic starch being a starch monoester of a dicarboxylic acid in which the two carboxylic acid groups are positioned on adjacent carbons, said dicarboxylic acids selected from the group consisting of aliphatic, aromatic, cycloaliphatic, bicycloaliphatic dicarboxylic acids and alkyl and fluorine, chlorine and bromine substituted derivatives thereof; and said dicarboxylic acids or substituted dicarboxylic acids have a total of 8-22 carbon atoms.

19. The starch blend of claim 18 wherein the hydrophobic starch is the monoester of dicarboxylic acids selected from the group consisting of n-octylsuccinic acid, 1-octenyl-succinic acid, phthalic acid, 1,4,5,6,7,7-hexachloro-5-norbornene-2,3-dicarboxylic acid, tetrachlorophthalic acid, endo-cis-5-norbornene-2,3-dicarboxylic acid, hexahydro-4-methylphthalic acid, 1,2-cyclohexane-dicarboxylic acid, and cis-4-cyclohexene-1,2-dicarboxylic acid.

20. The starch blend of claim 18 wherein the hydrophobic starch has a degree of substitution of from about 0.002 to 0.050.

21. The starch blend of claim 18 wherein the non-hydrophobic starch is selected from the group consisting of corn starch, waxy maize and cationically substituted corn starch.

22. The starch blend of claim 18 wherein the starch blend is comprised of 4-14 parts by weight of hydrophobic starch and 96-86 parts by weight of non-hydrophobic starch.

23. The process of claim 11 wherein the starch blend is comprised of 4-14 parts by weight of hydrophobic starch and 96-86 parts by weight of non-hydrophobic starch.